(12) United States Patent
Rüping et al.

(10) Patent No.: US 7,337,966 B2
(45) Date of Patent: Mar. 4, 2008

(54) TRANSMISSION INTERFACE

(75) Inventors: Stefan Rüping, Lengdorf (DE);
Laurent Sustek, Auriol (FR)

(73) Assignee: Infineon Technologies AG (DE)

( * ) Notice: Subject to any disclaimer, the term of this patent is extended or adjusted under 35 U.S.C. 154(b) by 123 days.

(21) Appl. No.: 11/094,841

(22) Filed: Mar. 30, 2005

(65) Prior Publication Data
US 2005/0224588 A1 Oct. 13, 2005

(30) Foreign Application Priority Data
Mar. 30, 2004 (DE) ...................... 10 2004 015 535

(51) Int. Cl.
*G06K 19/06* (2006.01)

(52) U.S. Cl. ...................... 235/441; 235/492

(58) Field of Classification Search ................ 235/492, 235/487, 486, 375, 449, 491, 493; 710/10, 710/1, 15, 240, 100, 14; 455/3.02, 179.1
See application file for complete search history.

(56) References Cited

U.S. PATENT DOCUMENTS

| | | | |
|---|---|---|---|
| 5,440,302 A * | 8/1995 | Irmer et al. ............... 340/10.34 |
| 5,574,273 A * | 11/1996 | Nakagawa et al. ......... 235/492 |
| 5,790,937 A * | 8/1998 | Gutle .......................... 725/135 |
| 5,959,998 A | 9/1999 | Takahashi et al. |
| 6,151,647 A | 11/2000 | Sarat |
| 6,351,813 B1 * | 2/2002 | Mooney et al. ............. 713/185 |
| 6,439,464 B1 | 8/2002 | Fruhauf et al. |
| 6,557,754 B2 | 5/2003 | Gray et al. |
| 6,581,122 B1 | 6/2003 | Sarat |
| 6,830,193 B2 * | 12/2004 | Tanaka ........................ 235/492 |
| 6,901,459 B2 * | 5/2005 | Frey et al. .................... 710/15 |
| 6,925,284 B2 * | 8/2005 | Asami ........................ 455/3.02 |
| 2001/0000405 A1 | 4/2001 | Gray et al. |
| 2001/0000814 A1 * | 5/2001 | Montgomery et al. ........ 710/10 |
| 2002/0103944 A1 | 8/2002 | Feuser et al. |
| 2004/0054817 A1 * | 3/2004 | Frey et al. ...................... 710/1 |

FOREIGN PATENT DOCUMENTS

| | | |
|---|---|---|
| DE | 41 00 693 A1 | 7/1991 |
| DE | 103 17 289 A1 | 11/2003 |
| WO | WO 89/05549 | 6/1989 |

OTHER PUBLICATIONS

ISO/IEC 7816—Microsoft Internet Explorer; Technical Notes: ISO/IEC 7816; pp. 1-6, no date.
The Design of a Smart Card Interface Device: . . . —Microsoft Internet Explorer; "Smart Card Communications"; pp. 1-9, no date.
Press Release *More Schlumberger Press Releases*; Microsoft Internet Explorer; pp. 2-4, no date.

* cited by examiner

*Primary Examiner*—Thien Minh Le
(74) *Attorney, Agent, or Firm*—Dickstein, Shapiro, LLP.

(57) ABSTRACT

A data transmission method and interface for interchanging data between a reader and a chip card, wherein the data transmission interface has a variable number of channels.

17 Claims, 3 Drawing Sheets

TRANSMISSION INTERFACE

CROSS-REFERENCE TO RELATED APPLICATION

This application claims priority to German Patent Application Serial No. 102004015535.6, filed Mar. 30, 2004, and which is incorporated herein by reference in its entirety.

FIELD OF THE INVENTION

The invention relates to a data transmission interface for interchanging data between a reader and a chip card, particularly chip cards which are connected to the reader via contacts.

BACKGROUND OF THE INVENTION

A chip card is understood as meaning a card-like carrier having an integrated circuit. The integrated circuit is provided with an interface that enables a data connection to the reader. In this case, the integrated circuit (called chip for short) may be a memory chip, which stores data, or a microprocessor, which can process and manage data. Chip cards having memory chips are used, for example, as telephone cards, health insurance cards and cards for cashless payment. The more complex chip cards having microprocessors are primarily used for encryption, for example for authenticating a SIM module in the GSM mobile radio system, and can carry out complex computation operations. Combinations of the two types of chip card have also been formed to an increasing extent in the meantime.

A standard interface is imperative for widespread use of chip cards. The ISO 7816 standard is the most widespread interface standard for chip cards having contacts and defines mechanical and electrical properties of the chip card in order to ensure compatibility. In order to connect the chip card to the reader, this standard provides eight contact areas, which are shown in FIG. 1. Contact C1 is used to supply a supply potential VDD, contact C2 is used to supply the reset signal RST, contact C3 is used to supply the clock signal CLK, contact C4 is reserved for future use, contact C5 is used to supply the ground potential GND, contact C6 is used to supply a programming potential VPP, contact C7 is used to supply a data signal I/O and contact C8, like contact C4, is reserved for future use (RFU). Of eight contacts, six have a firmly defined function and two are reserved for future expansion. Since only six contacts are required, chip cards which, for reasons of cost, have only six contacts are also found in addition to chip cards having eight contacts.

FIG. 2 shows the transmission of data between a chip card and a reader in accordance with ISO 7816. Of the requisite connections between the chip card contacts 1 and the reader contacts 2, only the connection for the data signal I/O is shown between the contacts C7. Information is exchanged in digital form, bit by bit, between the chip card and the reader by means of this connection. Since there is only one line, either the reader transmits and the chip card receives or the chip card transmits and the reader receives. This type of data transmission is known as serial half-duplex communication. The data which are processed byte by byte by the chip card processor need to be converted into a bit-serial data stream. Each byte is separated into its eight individual bits, which are then transmitted successively over the line.

The duration of such a data bit is determined by a divisor which defines the number of clock pulses for which one data bit lasts. Since chip cards do not have their own clock, the externally applied clock CLK of the reader is used. The data transmission rate is thus directly proportional to the external clock CLK and to the divisor. As the functionality of chip cards increases, the volume of data to be transmitted between the chip card and the reader also increases. In order to maximize the data transmission rate, ever smaller divisors and ever higher frequencies have recently been used. The current data transmission rate upper limit of 10 MHz/32=312.5 kbit/sec is obtained for a maximum clock frequency of 10 MHz and a minimum divisor of 32.

At these high data transmission rates, the time available to the chip card's operating system for controlling transmission and reception and for processing data further is becoming ever shorter. In order to relieve the load on the operating system and on the chip card microprocessor, data interchange is increasingly being assisted by special hardware for data transmission. An interface chip, the "UART" (Universal Asynchronous Receiver Transmitter), can be used to increase the data transmission rates, irrespective of the chip card processor power, and to reduce the expenditure on software for data interchange.

The reader controls communication between the reader and the chip card in accordance with ISO 7816. After the chip card has been inserted into the reader and the reader contacts 1 have been connected to the chip card contacts 2, the contacts are electrically activated in a prescribed order. The chip card then automatically carries out a power-on reset and transmits an answer-to-reset (ATR) message to the reader. This ATR contains various information about the chip card's scope of functions and the data transmission parameters or transmission protocols. After the ATR has been evaluated by the reader, the reader can also optionally transmit a protocol-type-selection (PTS) command to the chip card, which command can be used to set the parameters of the chip card's transmission protocol.

After the data transmission interface has been set up, the reader can transmit commands to the chip card. The chip card processes the command and sends a reply to the reader. The latter transmits the next command, which is processed in a similar manner in accordance with the master/slave principle. Communication, during which the reader is the master and the chip card is the slave, continues until the connection is cleared.

Data are interchanged between the chip card and the reader, in accordance with ISO 7816, via a serial interface using the half-duplex method, the maximum data transmission rate being 312.5 kbit/sec. If this data transmission rate was previously sufficient, it proves to be a bottleneck in communication between the chip card and the reader as the memory power and processor power increase. If data interchange is controlled only by the operating system's software, the processor speed imposes additional limits in this case, with the result that the maximum data transmission rate can be achieved only by using a UART. In order to achieve an even higher transmission rate, work is being put into standardization efforts which provide for reducing the division factor even further and increasing the clock frequency. Internally multiplying the clock rate is also being considered as a solution. An entirely different approach provides for using an additional interface, for example a USB (Universal Serial Bus), which has a higher data transmission rate of 1.5 Mbit/sec to 12 Mbit/sec (U.S. Pat. No. 6,439,464 B1). However, the disadvantage of this solution is that an additional protocol for transmitting the data is also required in addition to an additional interface. All of the hardware and software for controlling the data need to be correspondingly extended.

SUMMARY OF THE INVENTION

The invention is therefore based on an object of increasing the data transmission rate between a chip card and a reader.

According to the invention, this object is achieved by virtue of the fact that the data transmission interface for interchanging data between the chip card and the reader has a variable number of channels, and methods for operating a data transmission interface of this type are specified.

BRIEF DESCRIPTION OF THE DRAWINGS

The invention will be explained in more detail below using an exemplary embodiment and with reference to the drawings.

DETAILED DESCRIPTION OF PREFERRED EMBODIMENTS OF THE INVENTION

The data transmission method and interface for interchanging data between a chip card and a reader has a variable number of channels.

The data transmission interface advantageously has at least two channels. This makes it possible for optimum use to be made of the available hardware in order to maximize the data transmission rate.

In another embodiment of the invention, the number of channels in the data transmission interface is determined by the data rate to be transmitted. In addition, the number of parallel channels for the data transmission interface can be determined by the hardware available in the reader and in the chip card.

One development of the inventive data transmission interface provides for some of the available parallel channels to be used simultaneously to transmit data in different directions. This has the advantage that data can be transmitted in the full-duplex mode.

In one preferred variant embodiment, the data transmission interface has properties in accordance with the ISO standard ISO 7816. This feature ensures compatibility with the existing reader infrastructure.

The data transmission interface advantageously has a special communication unit. The latter makes it possible to accelerate the transmission of data.

Figure 1:
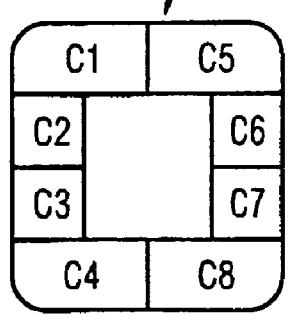
FIG. 1 shows the contacts of an interface in accordance with ISO 7816.
Figure 2:
FIG. 2 shows the serial transmission of data between a chip card and a reader in accordance with ISO 7816.
Figure 3:
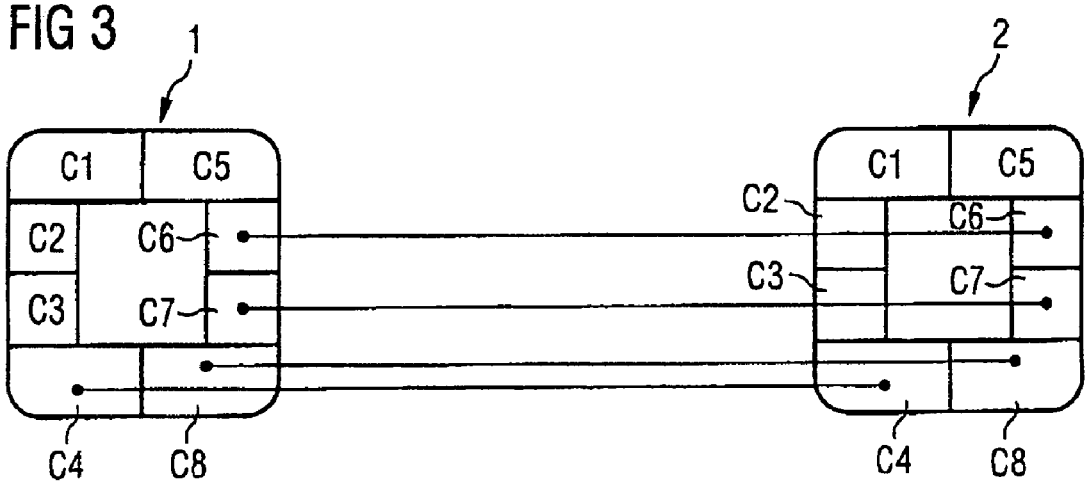
FIG. 3 shows one possible variant embodiment of the inventive data transmission interface for interchanging data between a chip card and a reader.

FIG. 3 shows one embodiment of the data transmission interface. As in FIG. 2, the chip card contacts 1 and the reader contacts 2 are shown. A fundamental feature of the invention is that, for the purpose of transmitting data, the three contacts C4, C6 and C8 on the chip card are additionally also connected to those on the reader in addition to the connection via the data signal contact C7. Instead of only one serial line, there are now four parallel lines. This makes it possible to increase the maximum data transmission rate by a factor of four. A transmission rate of 1.25 Mbit/s is thus achieved for a clock frequency of 10 MHz and a divisor of 32.

As previously, the contact pair C7 is used for transmitting data. ISO 7816 does not stipulate the use of the contact pairs C4 and C8, and they may therefore likewise be used for transmitting data. The contact pairs C6 were needed by the first generation of chip cards in order to transmit the high currents and voltages which were required when programming the EPROM from the reader to the chip card. However, in contrast to the EPROMs, the EEPROMs used nowadays can be programmed using a voltage that is generated on the chip by a charge pump. The contacts C6 are therefore no longer used and can likewise be used for transmitting data.

Figure 4:
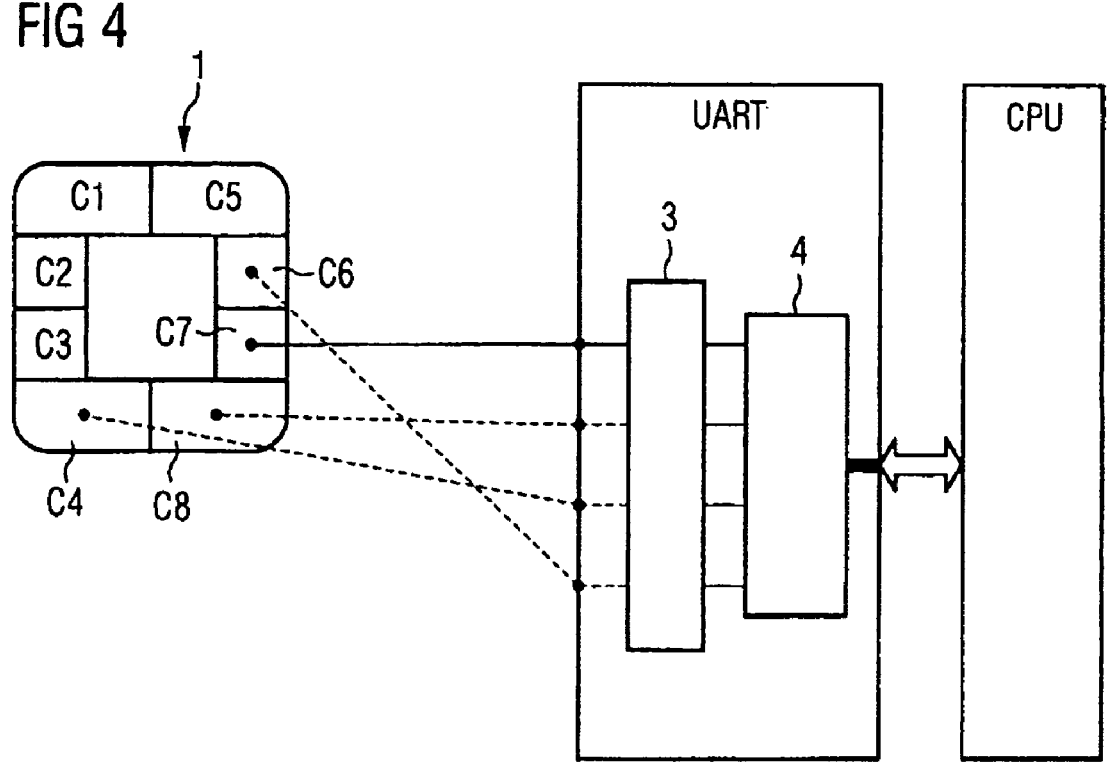
FIG. 4 shows one possible embodiment for conditioning data in a UART for interchanging data via the inventive data transmission interface.

FIG. 4 shows another refinement of the embodiment at the chip card end. A UART, which constitutes a reception and transmission unit that controls the transmission of data and thus relieves the load on the chip card processor, is provided. Data which are transmitted bit by bit, via the serial interface, from contact C7 to the UART are combined in the latter to form bytes or data blocks and are then transmitted to the CPU.

Not only the contact C7 (solid line) but also the contacts C4, C6 and C8 (dashed lines) are connected to the UART. A selection circuit 3 is used to determine how many of these contacts are routed to the conversion unit 4. The data bits to be transmitted can thus be supplied to the conversion unit 4 in parallel. They are processed in parallel in the conversion unit and, having been combined in the form of bytes or data blocks, are forwarded to the chip card processor CPU. The great advantage of this arrangement is that neither the hardware nor the software in the chip card processor CPU needs to be changed. The only change required is made in the UART. Instead of the data being combined bit by bit to form bytes or data blocks, they are now received and processed further in parallel by the UART.

The number of channels used for parallel data transmission is thus variable. If only one channel is used, there is full compatibility with the ISO 7816 standard. This is particularly important when one of the two interface users, the reader or the chip card, does not support parallel data transmission. All of the data are then transmitted, as usual, via the contact C7. In the case of a chip card having only 6 contacts, the contacts C4 and C8 are not available for transmitting data. Nevertheless, it is possible to set up two channels for transmitting data by additionally using the contact C6 for the programming voltage in addition to the known contact C7. Parallel data transmission using three or four channels is only possible in chip cards having eight contacts. In this case, provision is made for the number of channels used to be selected on the basis of the hardware available in the reader and in the chip card. This can be carried out automatically during the answer-to-reset (ATR) and, if appropriate, the protocol-type-selection (PTS) phases.

Since a plurality of channels are available for transmitting data, there is no longer any confinement to the half-duplex protocol either. Rather, it is possible to determine how many channels are to transmit data in which direction. By way of example, all four channels can thus be used to transmit data from the reader to the chip card. It is also possible for data to be interchanged simultaneously between the reader and the chip card. The channels can be divided up evenly for this full-duplex mode. If there are a total of four channels, two channels can be used for transmitting data from the reader to the chip card and another two channels can be used for transmitting data from the chip card to the reader. In addition to this even division, it is also conceivable, for example, to use only one channel for transmitting data from the reader to the chip card and to use three channels for transmitting data from the chip card to the reader. This situation is similar to that of an asymmetric DSL connection having different uplink and downlink transmission rates. If only two channels are available, for example in the case of a chip card having only six contacts, the channels may be used in parallel in the half-duplex mode or may be used individually for full-duplex transmission. The total number of channels and how many channels are used in which direction can be selected by the UART on the basis of the commands to be executed and the associated interchange of data.

Figure 5:
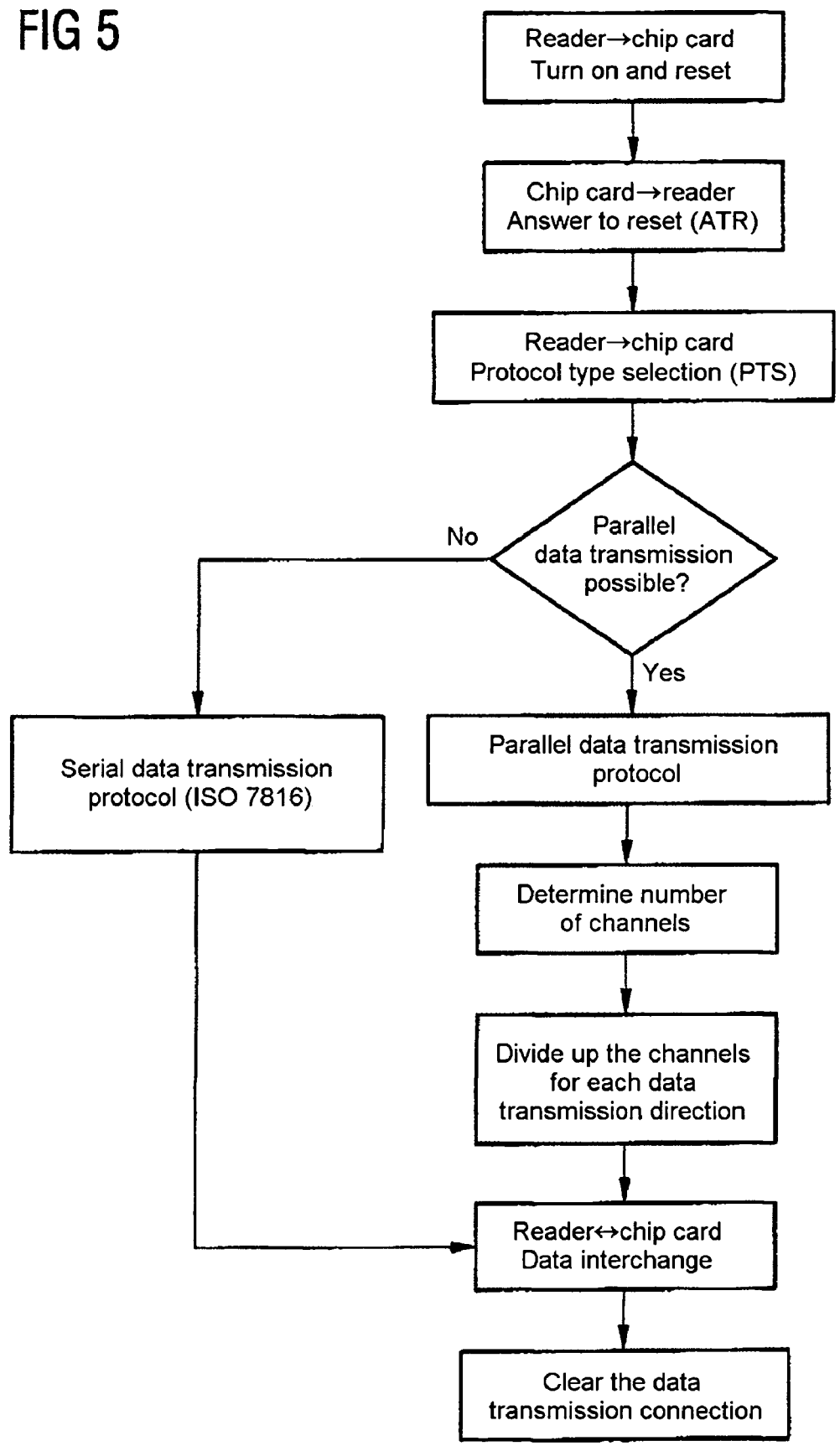
FIG. 5 shows one possible sequence for setting up the data transmission interface for interchanging data between a reader and a chip card.

FIG. 5 shows a flowchart of the individual steps for setting up a data transmission interface between a reader and a chip card. The first three steps in the flowchart correspond to the conventional procedure and are effected in accordance with the ISO 7816 standard. The reader first of all sends a turn-on and reset command to the chip card. The chip card uses an answer to reset (ATR) to respond to the command. In this case, this answer to reset contains the data transmission parameters which are stored in the chip card. The reader then sends a protocol-type-selection (PTS) command to the chip card. The PTS command is used to request a change to data transmission protocol parameters. On the basis of the hardware available in the reader and in the chip card, a decision is made as to whether parallel data transmission is possible. If the chip card or the reader has not been designed for this, serial communication, in which the data are transmitted serially bit by bit, takes place in accordance with ISO standard 7816. If the protocol which has been negotiated using the available hardware indicates that parallel data transmission is possible between the chip card and the reader, a stipulation of the number of channels which are to be used in parallel follows in the next step. This selection can be made, for example, on the basis of the volume of data to be transmitted. The next step determines how many of the channels will be used for transmitting data from the chip card to the reader and how many will be used for transmitting data from the reader to the chip card. If, for example, large volumes of data are to be read out from the chip card, it is expedient to bundle together a plurality of channels for this channel. This makes it possible to optimize the transmission of data between the reader and the chip card in accordance with the respective situation and requirement. The data are transmitted after the data interface has been set up. When communication has ended, the data interface is cleared again. The option of selecting whether a serial or a parallel interface is to be set up makes it possible to carry out compatible and fast data transmission operations in a heterogeneous world of readers.

The above description of the exemplary embodiments in accordance with the present invention serves only to illustrate and not to restrict the invention. Various changes and modifications are possible within the scope of the invention without departing from the scope of the invention and its equivalents.

What is claimed is:

1. A data transmission interface for interchanging data between a reader and a chip card the chip card having a plurality of contacts, wherein the data transmission interface has a variable number of channels, the variable number of channels are realized by a variable number of contacts.

2. The data transmission interface of claim 1, wherein the data transmission interface has at least 2 channels.

3. The data transmission interface of claim 1, wherein the number of channels for transmitting data is determined by a data transmission rate.

4. The data transmission interface of claim 1, wherein the number of channels for transmitting data is determined by the hardware available in the reader and in the chip card.

5. The data transmission interface of claim 1, wherein some of the channels are used for transmitting data from the reader to the chip card and the other channels are used for simultaneously transmitting data from the chip card to the reader.

6. The data transmission interface of claim 1, wherein the data are transmitted in accordance with the ISO 7816 standard.

7. The data transmission interface of claim 1, further comprising a communication unit (UART).

8. The data transmission interface of claim 7, further comprising a CPU, wherein the UART comprises:
    a conversion unit for combining data from the variable number of channels, and forwarding the combined data to the CPU; and
    a selection unit for determining a number of the channels that are routed to the conversion unit.

9. A method for interchanging data via a data transmission interface, wherein the data are transmitted over a variable number of channels.

10. The method of claim 9, wherein the number of channels in the data transmission interface is determined based on hardware available in the users involved in interchanging data.

11. The method of claim 9, wherein the number of channels in the data transmission interface is determined based on the data to be transmitted.

12. The method of claim 11, wherein the number of channels in the data transmission interface is determined based on a volume of the data to be transmitted.

13. The method of claim 11, wherein the number of channels in the data transmission interface is determined based on the data transmission direction.

14. The method of claim 11, wherein the number of channels in the data transmission interface is determined based on a data transmission rate.

15. A data transmission means for interchanging data via a reader and a chip card, wherein the data are transmitted over a variable number of channels.

16. A method for interchanging data between a reader and a chip card via a data transmission interface, comprising the steps of:
    selecting a number of parallel channels of the data transmission interface, wherein the number of channels is variable;
    determining a number of channels which will transmit data from the chip card to the reader and a number of channels which will transmit data from the reader to the chip card; and
    transmitting the data over the channels.

17. The method of claim 16, wherein the selecting step is performed based on the volume of data to be transmitted.

* * * * *